(12) United States Patent
Ranganathan et al.

(10) Patent No.: US 11,746,250 B2
(45) Date of Patent: Sep. 5, 2023

(54) COMPOSITIONS AND COATINGS FORMED THEREOF WITH REDUCED ICE ADHERENCE AND ACCUMULATION

(71) Applicants: Sathish Kumar Ranganathan, Avon, IN (US); Srinivas Siripurapu, Carmel, IN (US); Vijay Mhetar, Carmel, IN (US); Jeffrey P. Youngblood, Crawfordsville, IN (US); John Howarter, West Lafayette, IN (US)

(72) Inventors: Sathish Kumar Ranganathan, Avon, IN (US); Srinivas Siripurapu, Carmel, IN (US); Vijay Mhetar, Carmel, IN (US); Jeffrey P. Youngblood, Crawfordsville, IN (US); John Howarter, West Lafayette, IN (US)

(73) Assignee: GENERAL CABLE TECHNOLOGIES CORPORATION, Highland Heights, KY (US)

( * ) Notice: Subject to any disclaimer, the term of this patent is extended or adjusted under 35 U.S.C. 154(b) by 637 days.

(21) Appl. No.: 15/586,996

(22) Filed: May 4, 2017

(65) Prior Publication Data
US 2017/0321077 A1    Nov. 9, 2017

Related U.S. Application Data
(60) Provisional application No. 62/331,845, filed on May 4, 2016.

(51) Int. Cl.
| | | |
|---|---|---|
| C09D 127/12 | (2006.01) | |
| C09K 3/18 | (2006.01) | |
| H01B 9/00 | (2006.01) | |
| H01B 3/46 | (2006.01) | |
| H01B 3/44 | (2006.01) | |
| C09D 127/18 | (2006.01) | |
| H01B 3/28 | (2006.01) | |

(52) U.S. Cl.
CPC ......... *C09D 127/12* (2013.01); *C09D 127/18* (2013.01); *C09K 3/18* (2013.01); *H01B 3/445* (2013.01); *H01B 3/46* (2013.01); *H01B 9/008* (2013.01); *C08L 2205/03* (2013.01); *H01B 3/28* (2013.01)

(58) Field of Classification Search
CPC .. C09D 127/18; C09D 127/12; C08K 5/0025; C08L 33/16; C08L 83/04; C08L 2205/03; C09K 3/18; H01B 3/28; H01B 3/445; H01B 3/46; H01B 9/008
See application file for complete search history.

(56) References Cited

U.S. PATENT DOCUMENTS

| | | |
|---|---|---|
| 7,015,395 B2 | 3/2006 | Goldsworthy et al. |
| 7,438,971 B2 | 10/2008 | Bryant et al. |
| 7,752,754 B2 | 7/2010 | Goldsworthy et al. |
| 9,328,245 B2 | 5/2016 | Siripurapu et al. |
| 10,308,815 B2 | 6/2019 | Ranganathan et al. |
| 10,836,914 B2 | 11/2020 | Ranganathan et al. |
| 2002/0034650 A1 | 3/2002 | Neely, Jr. |
| 2003/0071241 A1 | 4/2003 | Chon et al. |
| 2003/0185990 A1 | 10/2003 | Bittner et al. |
| 2004/0022951 A1 | 2/2004 | Maurus |
| 2005/0031790 A1 | 2/2005 | Jackson et al. |
| 2006/0003175 A1* | 1/2006 | Kanega ................. B29C 66/71 428/474.4 |
| 2006/0281861 A1 | 12/2006 | Putnam |
| 2010/0009280 A1 | 1/2010 | Liu et al. |
| 2010/0119850 A1 | 5/2010 | Browne et al. |
| 2014/0041925 A1 | 2/2014 | Davis et al. |
| 2014/0141262 A1 | 5/2014 | Castle et al. |
| 2014/0205804 A1* | 7/2014 | Jones ................... B65D 83/752 428/141 |
| 2014/0234534 A1 | 8/2014 | Fish |
| 2015/0104641 A1 | 4/2015 | Mhetar et al. |
| 2015/0194240 A1 | 7/2015 | Ranganathan et al. |
| 2015/0353737 A1 | 12/2015 | Siripurapu et al. |
| 2015/0361319 A1 | 12/2015 | Gao |
| 2015/0368496 A1 | 12/2015 | Hawig |
| 2016/0042837 A1 | 2/2016 | Ranganathan et al. |
| 2016/0083862 A1 | 3/2016 | Malshe et al. |
| 2017/0321077 A1 | 11/2017 | Ranganathan et al. |

FOREIGN PATENT DOCUMENTS

| | | | |
|---|---|---|---|
| CN | 101125979 A | | 2/2008 |
| CN | 102746782 A | | 10/2012 |
| CN | 102977700 A | * | 3/2013 |
| CN | 102977700 A | | 3/2013 |
| DE | 3824608 C1 | | 8/1989 |

(Continued)

OTHER PUBLICATIONS

English Machine Translation: Dang et al. (CN 102977700 A) (Year: 2013).*
Parker, Bob, FEVE Fluoropolymer Resins for HighPerformance, Long-Life Coatings on Roof Surfaces, AGC Chemicals, Chemistry fora Blue Planet, International Roof Coatings Conference, Jul. 16-19, 2012 (Year: 2012).*
Copenheaver, Blaine R.; International Search Report and Written Opinion of the International Searching Authority, issued in International Application No. PCT/US2017/031084; dated Jul. 21, 2017; 8 pages.
Lopez, Viviana Villar; First Examination Report issued in Chilean Patent Application No. 2018-003106; dated Aug. 9, 2019; 20 pages, including partial English machine translation.

(Continued)

*Primary Examiner* — Holly Rickman
*Assistant Examiner* — Linda N Chau
(74) *Attorney, Agent, or Firm* — Frost Brown Todd LLP

(57) ABSTRACT

A durable coating which reduces ice adhesion and minimizes ice accumulation includes a polymeric binder and a film forming lubricant. The polymeric binder is selected from a fluoropolymer or silicone polymer having one or more reactive groups. The film forming lubricant is a lubricous fluoropolymer or silicone polymer. Methods of applying a durable coating are also disclosed.

18 Claims, No Drawings

(56) References Cited

FOREIGN PATENT DOCUMENTS

| FR | 2971617 A1 | 8/2012 |
|---|---|---|
| GB | 2340495 A | 2/2000 |
| WO | 96/00654 A1 | 1/1996 |
| WO | 2004/076570 A1 | 9/2004 |
| WO | 2010042191 A1 | 4/2010 |
| WO | 2015/119943 A1 | 8/2015 |
| WO | 2018/081564 A1 | 5/2018 |

OTHER PUBLICATIONS

Farzaneh, Masoud et al.; Coatings for Protecting Overhead Power Network Equipment in Winter Conditions; Sep. 2015; 116 pages; published by Cigre.

Dotan, Ana et al.; Abstract of article, "The Relationship between Water Wetting and Ice Adhesion"; Journal of Adhesion Science and Technology 23(15); Sep. 2009; 5 pages.

Bharathidasan, T. et al.; Effect of wettability and surface roughness on ice-adhesion strength of hydrophilic, hydrophobic and superhydrophobic surfaces; Jun. 21, 2014; Applied Surface Science, vol. 314; pp. 241-250.

Parry, Julian; Extended European Search Report, including the supplementary European search report and the European search opinion, issued in European Patent Application No. 17793351.2; dated Mar. 6, 2020; 13 pages.

Database CA, Chemical Abstracts Service, Columbus, Ohio; Database accession No. 2012:1571083; Abstract of Chinese Patent No. 102746782A, Antiicing and anti-frosting polyurethane coating and preparation method thereof; issued on Oct. 24, 2012; Inventor Wang, Xupeng et al.; 2 pages.

Parry, Julian; Partial Supplementary European Search Report, issued in European Patent Application No. 17793351.2; dated Dec. 17, 2019; 14 pages.

* cited by examiner

COMPOSITIONS AND COATINGS FORMED THEREOF WITH REDUCED ICE ADHERENCE AND ACCUMULATION

REFERENCE TO RELATED APPLICATIONS

The present application claims the priority benefit of U.S. provisional application Ser. No. 62/331,845, entitled COMPOSITIONS AND COATINGS FORMED THEREOF WITH REDUCED ICE ADHERENCE AND ACCUMULATION, filed May 4, 2016, and hereby incorporates the same application herein by reference in its entirety.

TECHNICAL FIELD

The present disclosure generally relates to coating compositions that reduce ice adherence and minimize ice accumulation.

BACKGROUND

The accumulation and buildup of ice on exposed power transmission equipment such as overhead conductors can cause a number of detrimental issues. For example, ice accumulation on overhead conductors can cause weight and load bearing issues due to the weight of the ice, increased wind loadings from enlarged cross-sectional areas, and hazards from falling ice. Similar issues can also occur when ice accumulates on aerospace equipment, automotive equipment, telecommunications equipment, construction equipment, and other commercial equipment. To prevent, or minimize, such detrimental issues, it is known to de-ice exposed equipment though techniques such as heating and mechanical ice removal. Such techniques are disadvantageous however because they are time intensive and remove ice only after accumulation occurs. It would be advantageous to provide a coating which can reduce ice adherence and preemptively minimize ice accumulation.

SUMMARY

In accordance with one embodiment, a coating composition includes a first polymer and a film forming lubricant. The first polymer includes a fluoropolymer or silicone polymer having one or more reactive groups. The film forming lubricant includes a second polymer. The second polymer includes fluoropolymer or silicone polymer. The first polymer and the second polymer are different.

In accordance with another embodiment, an overhead conductor includes one or more conductive wires and a coating surrounding the one of the one or more conductive wires. The coating is formed from a coating composition. The coating composition includes a first polymer and a film forming lubricant. The first polymer includes a fluoropolymer or silicone polymer having one or more reactive groups. The film forming lubricant includes a second polymer. The second polymer includes fluoropolymer or silicone polymer. The first polymer and the second polymer are different. Ice adheres to the coating with about 50 kPa or less of force to the coating.

In accordance with another embodiment, a coating for an article is formed from a cured coating composition. The coating composition includes a first polymer and a film forming lubricant. The first polymer includes a fluoropolymer or silicone polymer having one or more reactive groups. The film forming lubricant includes a second polymer. The second polymer includes fluoropolymer or silicone polymer. The first polymer and the second polymer are different. Ice adheres to the coating with about 50 kPa or less of force.

DETAILED DESCRIPTION

As will be described herein, a durable composition is disclosed which reduces ice adherence and ice accumulation on articles when such articles are coated with the durable composition. Coatings formed from such compositions can be effective in reducing ice adherence and accumulation on overhead conductors, power and energy equipment, aerospace equipment, automotive equipment, heat pumps, refrigerators, telecommunication equipment, construction equipment, and maritime equipment. The compositions are particularly suited to reduce ice adherence and accumulation on overhead conductors and power distribution lines. Generally, the compositions can include a fluorinated or silicone polymeric binder and a film forming lubricant that reduces ice adherence.

According to certain embodiments, suitable fluorinated or silicone polymeric binders for the described compositions can generally include any such polymer having reactive groups. For example, suitable polymeric binders can include fluorinated or silicone polymers having alkoxy (methoxy), hydroxyl, and/or acidic reactive groups in certain embodiments. The reactive groups can be pendant or terminal and can improve the processability and weatherability of the compositions. Non-limiting examples of suitable polymeric binders including such reactive groups can include methoxy functionalized silicone and fluoro copolymers such as fluoroolefin vinyl ether copolymer, hexafluoropropylene, halogenated trifluoroethylene, vinylfluoride, perfluoro alkyl vinyl ether, tetrafluoro ethylene, and perfluoro alkoxy polymer. In certain embodiments, a suitable fluorinated binder can be fluoroethylene vinyl ether ("FEVE") or polyvinylidene fluoride ("PVDF").

As can be appreciated, fluoroolefin vinyl ether is a copolymer of a fluoroolefin, cyclohexyl vinyl ether, and hydroxyalkyl vinyl ether. Fluoroolefin vinyl ether copolymers can have the general structure:

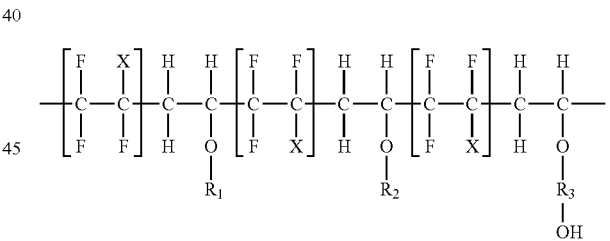

wherein X is Cl or F, $R_1$ and $R_2$ are independently $C_{2-8}$ alkyl or $C_6$ cycloalkyl; and $R_3$ is $C_{2-8}$ alkylene or $C_6$ cycloalkylene. The copolymer can also include repeating units of the formula:

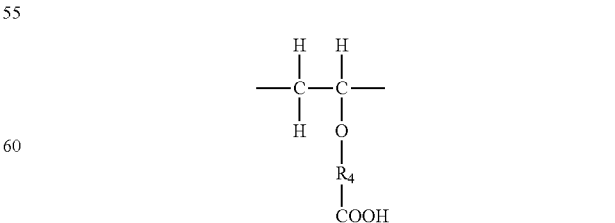

wherein $R_4$ is $C_{2-8}$ alkylene or $C_6$ cycloalkylene.

Fluoroolefin vinyl ether copolymers can be amorphous, alternating thermosetting polymers that include a fluoroolefin and a vinyl monomer. Suitable fluorolefins can include tetrafluoroethylene and chlorotrifluoroethylene and suitable vinyl monomers can include alkylvinyl ethers, for example ethyl, butyl or cyclohexyl vinyl ethers, and hydroxyvinyl ethers such as 2-hydroxyethyl vinyl ether. Specific fluoroolefin vinyl ether copolymer compounds that can be included in a composition can include fluoroethylene vinyl ether copolymer ("FEVE") compounds.

In certain embodiments, suitable silicone polymeric binders can be high temperature resins. As can be appreciated, high temperature silicone resins can provide high temperature stability and good weathering resistance. Examples of suitable high temperature silicone resins can include methoxy functionalized methylphenyl silicone resin and methoxy functionalized methyl silicone resin.

The number average molecular weight ($M_n$) of suitable polymeric binders for the described compositions can vary. For example, suitable polymeric binders can have an $M_n$ from about 5,000 g/mol to about 120,000 g/mol in certain embodiments; from about 10,000 g/mol to about 90,000 g/mol in certain embodiments; from about 15,000 g/mol to about 70,000 g/mol in certain embodiments; and from about 25,000 g/mol to about 50,000 g/mol in certain embodiments. In certain embodiments, the $M_n$ can be about 50,000 g/mol or less; and in certain embodiments, the $M_n$ can be about 25,000 g/mol or less.

In certain embodiments having hydroxyl reactive groups, the polymeric binder can include at least 10 mg of KOH per gram of the binder. In certain embodiments, the polymeric binder can include about 50 mg to about 100 mg KOH per gram of the polymeric binder; in certain embodiments about 75 mg KOH per gram of polymeric binder or more; and in certain embodiments about 85 mg KOH per gram of polymeric binder or more. Hydroxyl groups can increase the water dispersibility of the polymeric binder and can also act as a cross-linking site.

As can be appreciated, suitable polymeric binders can provide excellent weathering and thermal resistance characteristics to the described compositions and can allow coatings formed from such compositions to be durable and heat resistant. Polymeric binders can have high film hardness and low surface lubricity. In certain embodiments, the polymeric binder can constitute about 20% to about 80%, by dry weight, of a composition, and in certain embodiments, the polymer binder can be about 30% to about 60%, by dry weight, of the composition.

In certain embodiments, the polymeric binders can be delivered in liquid form. For example, the polymeric binder can be dissolved in a solution or can be provided as part of an emulsion. Generally, any suitable solvent can be used to dissolve or emulsify the polymeric binder including, for example, aqueous and organic solvents. Upon application of the composition to a substrate, the aqueous or organic solvent can be evaporated off. In certain embodiments, the polymeric binder can be dissolved or dispersed in water.

Additional details about suitable fluorinated polymeric binders are disclosed in U.S. Patent App. Pub. No. 2016/0042837 which is hereby incorporated by reference.

In certain embodiments, a coating composition can be substantially free of organic solvents. As used herein, substantially free can mean the coating composition contains about 10% or less by weight of an organic solvent; about 5% or less by weight of an organic solvent; about 2% or less by weight of an organic solvent; about 1% or less by weight of an organic solvent; about 0.5% or less by weight of an organic solvent; or essentially no organic solvent.

In certain embodiments, an emulsifier can be included in a coating composition to maintain an even dispersion of compounds in an aqueous water solution. As can be appreciated, the need for an emulsifier can depend on the components in the coating composition. For example, a fluoro copolymer polymer binder with relatively large quantities of hydroxyl groups can be water dispersible without the need for an emulsifier. When included, suitable emulsifiers can include sodium lauryl sulfate, sodium dodecyl phenylsulfonate, potassium stearate, sodium dioctyl sulfosuccinate, dodecyl diphenyloxy disulfonate, ammonium nonyl phenoxyethyl poly(l) ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium α-olefin($C_{14}$-$C_{16}$)sulfonate, hydroxyl alkanol sulfate, tetra sodium N-(1,2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate.

To reduce ice adherence and the accumulation of ice on coated articles, a film forming lubricant can be added to the coating composition. A film forming lubricant can impart high lubricity and low friction to the resultant coating which can reduce ice adherence strength. For example, in certain embodiments, the addition of about 15%, by dry weight, of a film forming lubricant can reduce the strength of ice adherence to a coating by about 30% or more in comparison to a similar coating formed without the film forming lubricant. In certain embodiments, ice adherence strength can be reduced by about 50% or more. As can be appreciated, low ice adherence strength can also reduce the accumulation of ice on an article.

Film forming lubricants can impart additional effects to the described compositions. For example, a film forming lubricant can increase the rate of drying in certain embodiments. In such embodiments, the drying time of the composition can be reduced.

Suitable film forming lubricants for a coating composition can include film forming silicone polymers and fluoropolymers that have high lubricity. In certain embodiments, film forming lubricants can be free of reactive groups. For example, suitable film forming lubricants can include cyclosilicone and fluorinated ethylene-propylene ("FEP") in certain embodiments. A coating composition can include about 1% to about 40%, by dry weight, of a film forming lubricant in certain embodiments and about 10% to about 20%, by dry weight, of a film forming lubricant in certain embodiments. In certain embodiments, a film forming lubricant can be included in smaller quantities, by dry weight, than the polymeric binder.

As can be appreciated, it can be advantageous to optionally crosslink a coating composition in certain embodiments to increase the durability and hardness of the coating. Generally, a coating composition as described herein can be crosslinked through any suitable method including, for example, moisture, chemical, heat, UV, and e-beam curing methods. In certain embodiments, crosslinking can be performed under ambient conditions. Suitable crosslinking agents can include crosslinking agents which are reactive to the hydroxyls, acids, and alkoxy (methoxy) reactive groups of the polymeric binder. Examples of suitable chemical crosslinking agents can include isocyanate compounds, silanes (including methoxy silanes and epoxy silanes), and reactive silicones. Suitable crosslinking agents can be included, by dry weight, at about 5% to about 45% of the coating composition in certain embodiments and at about 10% to about 35% in certain embodiments. As can be appreciated however, crosslinking can also occur in the absence of a crosslinking agent when certain polymeric binders having relatively large quantities of reactive groups are selected.

In certain illustrative embodiments, a polymeric binder can include hydroxyl groups that can be crosslinked with a polyisocyanate crosslinking agent such as hexamethylene-6,6-diisocyanate ("HDI"). Such HDI agents can be either aromatic or aliphatic based. Additional details about suitable crosslinking agents for fluorinated polymeric binder agents are disclosed in U.S. Patent App. Pub. No. 2016/0042837 which is hereby incorporated by reference.

In certain embodiments, crosslinking can also be promoted by inclusion of a suitable catalyst such as a metal or acid-sulphonic acid compound as known in the art. When included, a catalyst can be about 0.5% or less, by dry weight, of a coating composition.

As can be appreciated, a coating composition can include a number of optional components in certain embodiments. For example, one or more non-film forming lubricants, coalescent agents, defoaming agents, heat and UV stabilizers, colorants and pigments, filler, adhesion promoters, viscosity modifiers, wetting agents, film leveling agents, and dispersion agents can be included to further modify the properties of a coating composition. Generally, such additives can constitute about 0.1% to about 20%, by dry weight, of a coating composition.

Non-film forming lubricants or lubricating oils can be included, for example, to improve the processability of coating compositions by forming a microscopic dispersed phase within the composition. During processing, applied shear can separate the non-film forming lubricant phase form the carrier polymer phase. The non-film forming lubricant can then migrate to the die wall to gradually form a continuous coating layer to reduce the backpressure of processing equipment. Suitable non-film forming lubricants can generally be selected from any known non-film forming lubricants such as dimethicone, fluorodimethicone, and polydimethylsiloxane ("PDMS") oil. In certain embodiments, a non-film forming lubricant can be miscible with the polymeric binder. In such embodiments, addition of a non-film forming lubricant will not form a separate phase with the polymeric binder and the glass transition temperature of the binder and non-film forming lubricant will be reduced. In certain embodiments, non-film forming lubricants cannot form a form a dry film. As can be appreciated, other silicone and fluoropolymer lubricants can also be suitable. A non-film forming lubricant can be included at about 1% to about 30%, by dry weight, in certain embodiments and at about 2% to about 10%, by dry weight, in certain embodiments.

In certain embodiments, coalescent agents or thickeners can be added to improve the film forming characteristics of a coating composition. In such embodiments, generally any coalescent agent as known in the art can be included to improve film formation.

A defoamer can be included in certain embodiments to inhibit or retard the formation of foam when water is added to the coating composition. Suitable examples of defoamers can include silicon-based antifoam agents and non-silicon-based antifoam agents. In certain embodiments, a surfactant can also be used as a defoamer. Suitable surfactants include, but are not limited to, cationic, anionic, or non-ionic surfactants, as well as fatty acid salts.

Stabilizers can be included in a coating composition to improve stability of coatings formed of the coating composition to UV, light, and heat. Stabilizers can also increase the lifespan of coatings. Suitable UV or light stabilizers can include benzotriazole-type, triazine-type UV absorbers, and hindered amine light stabilizers ("HALS") compounds. Suitable heat stabilizers can be selected from 4,6-bis (octylthiomethyl)-o-cresol dioctadecyl 3,3'-thiodipropionate; poly [[6-[(1,1,3,3-terramethylbutypamino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. According to certain embodiments, a suitable heat stabilizer can be 4,6-bis (octylthiomethyl)-o-cresol; dioctadecyl 3,3'-thiodipropionate and/or poly[[6-[(1,1,3,3-terramethylbutyl)amino]-1,3, 5-triazine-2,4-diyl][2,2,6,6-tetramethyl-4-piperidinyl) imino]-1,6-hexanediyl[(2,2,6,6-tetramethyl-4-piperidinyl) imino]].

As can be appreciated, any known colorant or pigment such as carbon black, cadmium red, iron blue and the like can also be optionally included in a coating composition to provide color to the resulting coatings.

In certain embodiments, a coating composition can include filler to increase the scratch resistance of coatings formed from the coating composition. Suitable fillers for inclusion in a coating composition can include metal oxides, metal nitrides, metal fluorides, rare earth elements, and metal carbides such as gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide ("silica"), chromium oxides, iron oxide, boron carbide, boron silicide, copper chromium oxide, titanium dioxide, aluminum nitride, boron nitride, alumina, aerogels, graphenes, graphite, carbon nanotubes, hollow glass spheres, diatomaceous earth minerals, glass spheres, phrase changing materials, and combinations thereof. In certain embodiments, the filler can have an average particle size of about 25 microns or less, and in certain embodiments, about 10 microns or less, in certain embodiments, 500 nanometers or less. When included, filler can be included at about 30% or less, by dry weight, in certain embodiments and at about 1% to about 25%, by dry weight, in certain embodiments.

In certain embodiments, a coating composition can alternatively be substantially free of filler. Compositions free of filler can demonstrate better resistance to ice adherence and ice accumulation than similar coating compositions which include filler.

Adhesion promotors can be included in the described compositions to improve adhesion of the coating to an article. Generally, known adhesion promoters such as heat resistant primers, lower molecular weight isocyanate dispersions, acidic oligomers, and epoxy oligomers can be suitable adhesion promoters.

In certain embodiments, viscosity modifiers, sometimes referred to as rheology modifiers, can be included to modify the rheological properties of the described compositions. Suitable viscosity modifiers can include anionic polyacrylate copolymers, hydrophobically modified anionic polyacrylate copolymers, hydrophobically modified ethoxylated urethanes, water, low volatile organic compound ("VOC") solvents, and vinylpyrrolidone copolymers.

Wetting agents can be included to lower the surface tension and improve the spreadability of the described compositions. Generally, any wetting agent known in the industry can be suitable including modified fatty alcohol ethoxylates, modified polyacrylate polymer, fatty acid modified polymers, and alkylpolyalkoxylate.

Film leveling agents can be included to reduce or minimize film defects such as crawling, fish-eyes, cratering and the like. Known film leveling agents can be included in the described compositions to minimize such defects. Examples of suitable film leveling agents can include dimethyl cyclohexyl phthalate, dibutyl sebacate, aqueous dispersions of oleochemical compounds, and polyethylene imine.

In certain embodiments, dispersion agents can be included in the described compositions to improve the separation of particles and compounds in the composition. Examples of suitable dispersants can include sodium salts of phosphoric acid esters and silanes including ethoxy silanes, methoxy silanes, hydroxy silanes, epoxy silanes, and amino silanes.

Coatings formed of the coating compositions described herein can demonstrate excellent resistance to ice adherence and accumulation both before and after heat and water aging. For example, coatings formed of the coating compositions described herein can demonstrate ice adherence values of about 100 kPa or less in certain embodiments; ice adherence values of about 75 kPa or less in certain embodiments; ice adherence values of about 50 kPa or less in certain embodiments; and ice adherence values of about 35 kPa or less in certain embodiments. Additionally the coatings can retain excellent ice adherence values after heat, water, and UV aging. For example, ice adherence values can increase by about 50% of less after heat aging for 30 days at 150° C., 200° C., 250° C., or 300° C. and after water aging at 90° C. for 7 days. In certain embodiments, ice adherence values can increase after such heat and water aging by about 100% or less. Ice adherence values were evaluated by coating a 4" by 4" aluminum sheet and then forming a 3" diameter by a 2" tall cylinder of ice on the coated sheet. The ice adherence strength was the force required to remove the ice cylinder from the coated sheet using an Instron Tensile machine applying a shear force parallel to the coated sheet.

In addition to favorable ice resistance properties, coatings formed the coating compositions described herein can also demonstrate excellent mechanical properties. For example, coatings formed from the coating compositions can pass a 5 inch Mandrel Bend Test both before and after heat, UV, and water aging. In certain embodiments, coatings can also pass a 2 inch Mandrel Bend Test or a 0.5 inch Mandrel Bend Test both before and after heat, UV, and water aging.

The coatings can also exhibit good hardness and abrasion resistance as demonstrated by passing the American Society of Testing and Materials ("ASTM") D 3363 pencil hardness test with a pencil hardness of H and in certain embodiments, a pencil hardness of 5H or greater. Generally, the coatings can have a roughness of about 3 microns or less as determined by a profilometer.

Coatings formed from coating compositions described herein can have a water contact angle of about 80° to about 140° in certain embodiments. As can be appreciated, although water contact angles of about 150° or greater are considered super hydrophobic, super hydrophobic contact angles do not necessarily reduce ice adherence or ice accumulation.

As can be appreciated, the described coatings provide a favorable balance of properties including excellent pencil hardness values, ice adhesion values, abrasion resistance, flexibility, self-healing, self-cleaning, corrosion resistance, IR reflectance, emissivity, and dust resistance. Additionally, these properties can be maintained after heat, UV, and/or water aging.

As used herein, the Mandrel Bend Test refers to a flexibility test for coatings. In the Mandrel Bend Test, coated samples are bent around cylindrical mandrels of decreasing diameter and then observed for any visible cracks in the coating at each of the mandrel sizes. The presence of visible cracks indicates failure of the sample. A sample passes the Mandrel Bend Test when no visible cracks are observed for a defined mandrel size. The Mandrel Bend Test can also evaluate flexibility of the coating after heat, UV, and water aging.

The ASTM D 3363 pencil hardness test is a qualitative evaluation of the hardness of the coating. In the ASTM D 3363 test, a pencil is moved along the surface of a coating with increasing force until the pencil breaks or the surface of the coating is scratched. The tests are continued until the pencil scratches the surface. The value of the highest hardness pencil lead that does not scratch the coating is reported as the result of the ASTM D 3363 test.

The coating compositions described herein can be produced in a high-speed disperser ("HSD"), ball mill, bead mill or other machine using techniques known in the art. In certain embodiments, a HSD can be used to make the coating composition by slowly added together and mixing each of the components together until the desired dispersion of the components is achieved. In certain embodiments, the mixer speed can be about 10 revolutions per minute ("RPM") or more to achieve the desired coating composition.

Once the coating composition is prepared, it can be applied to a substrate to provide the substrate with resistance to ice adherence and ice accumulation. Generally, any type of substrate can be coated with the coating composition including metal articles such as aluminum, copper, and steel substrates, as well as wood and glass articles. The articles can be overhead conductors, power and energy equipment, aerospace equipment, automotive equipment, heat pumps, refrigerators, telecommunication equipment, construction equipment, concrete or substrate applications, radar applications, or maritime equipment.

In certain embodiments, coatings formed from the coating compositions can be coated on an overhead conductor. As can be appreciated, the coating compositions can be applied to overhead conductors in a variety of configurations including aluminum conductor steel reinforced ("ACSR") cables, aluminum conductor steel supported ("ACSS") cables, aluminum conductor composite core ("ACCC") cables, all aluminum alloy conductor ("AAAC") cables, and composite cables. As can be appreciated, the wires in conductors can have a variety of cross sectional shapes including round and trapezoidal shapes. In certain embodiments, improved ice ice adhesion values can be achieved when the wires are trapezoidal. Examples of composite core cable designs are disclosed in U.S. Pat. Nos. 7,015,395, 7,438,971, and 7,752,754, each of which are incorporated herein by reference.

As can be appreciated, a coating composition can be applied to only certain individual wires of an overhead conductor in certain embodiments. For example, all of the wires of an overhead conductor can be coated in certain embodiments, or only selective wires can be coated. As can be appreciated, it can be advantageous in terms of time, material, or the like to coat only the outer-most wires of a conductor. Alternatively, the coating can be applied only to the outer surface of a bare overhead conductor. In one embodiment, the complete outer surface of a bare conductor can be coated, or in other embodiments only a portion of the bare conductor can be coated.

In certain embodiments, an article can optionally be prepared prior to the application of the coating composition. Suitable preparation processes can include chemical treatment, pressurized air cleaning, hot water or steam cleaning, brush cleaning, heat treatment, sand blasting, ultrasound, deglaring, solvent wipe, plasma treatment, corona treatment, and the like. In certain embodied process, the substrate can also, or alternatively, be deglared by sand blasting. As can be appreciated, preparation processes can be performed in-line or as a separate step.

A coating composition can be applied by a spray gun in certain embodiments. The spray gun can apply the coating composition using a pressure of about 10 psi to about 45 psi. In such embodiments, the spray gun nozzle can be placed perpendicular (e.g., at about 90°) to the longitudinal direction of the substrate to achieve a uniform coating on the substrate. In certain embodiments, two or more spray guns can be used to obtain more efficient, or uniform, coatings. The coating thickness and density can be controlled by the admixture viscosity, gun pressure, and conductor line speed. During the coating application, the substrate temperature can be maintained between 10° C. to 90° C. depending on the material.

Alternatively, a coating composition can be applied to an article by one or more of dipping, a brush, or a roller. In embodiments dipping a substrate, a cleaned and dried article can be dipped into the coating composition to allow the composition to completely coat the article. The article can then be removed from the coating composition and allowed to dry.

After application of the coating composition onto the article, the coating on the article can be dried and cured through evaporation either at room temperature or at elevated temperatures.

In certain embodiments, the coating can be dried with elevated temperatures. In such embodiments, an oven can be heated up to about 250° C., or in certain embodiments, from about 80° C. to about 150° C. Heat can alternatively be applied through hot air heating, induction heating, or direct flame exposure. Under such elevated temperature conditions, a coating composition can be dried in about 2 minutes or less in certain embodiments, in about 1 minute or less in certain embodiments, in about 30 seconds to about 40 seconds in certain embodiments, in about 1 second to about 30 seconds in certain embodiments, or in about 1 second to about 10 seconds in certain embodiments. In certain embodiments, the step of drying and curing the coating composition can be followed by additional post-curing processes.

Alternatively, in certain embodiments, the coating composition can be dried under ambient conditions at about 23° C. Under ambient conditions, a coating composition can be considered "touch to dry" in about 8 hours or less in certain embodiments, in about 5 hours or less in certain embodiments, and in about 2 hours or less in certain embodiments.

As can be appreciated, the process of drying and curing can take place in a continuous or batch manner. When the drying and curing process is run continuously, a substrate can exit the coating step and continuously enter an air knife and curing process. Alternatively, in a batch manner process, the curing step can be performed on individual sections of the article using, for example, a flaming process. As an illustrative example of a batch process for an overhead cable, after initial drying and partial curing, the coated cable can be wound on to a bobbin, which can subsequently be transferred to a curing process such as an oven. In continuous production, a conductor can instead be wound on a bobbin after continually transferring through a heated oven heated to about 50° C. to about 250° C., in certain embodiments at about 80° C. to about 150° C., for about 0.1 hour to about 24 hours in certain embodiments, and from about 1 minute to about 2 minutes in certain embodiments.

As can be appreciated, the coating composition can also be used with overhead conductors which are already installed and are currently in use including previously strung overhead conductors. Existing conductors can, in certain examples, be coated using a robotic system for automated or semi-automated coating. The automated system functions in three steps including the steps of (1) cleaning the conductor surface; (2) applying a coating on the conductor surface; and (3) drying the coating. As can be appreciated, certain steps, such as the steps of cleaning and drying, can be optional.

As can be further appreciated a coating composition can also be used with overhead transmission line accessories including, for example, transformers, insulators, dead-ends/termination products, splices/joints, products, suspension and support products, motion control/vibration products "dampers", guying products, wildlife protection and deterrent products, conductor and compression fitting repair parts, substation products, clamps and other transmission and distribution accessories. Such products can be commercially obtained from a variety of manufacturers including Preformed Line Products (PLP) of Cleveland, Ohio and AFL of Duncan, S.C. In such embodiments, the coating can be applied at a factory where the accessories are produced or stored, or on-site prior to installation. In other embodiments, the coatings can be applied to previously installed accessories.

EXAMPLES

Tables 1 and 2 depict examples evaluating the ice resistance of various coated articles. Table 1 depicts Comparative Examples 1 to 5 while Table 2 depicts Inventive Examples 6 to 16 formed from coating compositions described herein. Each of the components in Tables 1 and 2 are described by their actual weight and not by percentage or dry weight percentage.

Below are details of the primary components used in the Examples of Tables 1 and 2.
1. Polymeric Binder 1: Lumiflon® FD 1000 from AGC Chemicals, water-based FEVE dispersion having 40 weight % solids content, a $M_n$ of about 10,000, and a hydroxyl value of about 85 mg KOH/g.
2. Polymeric Binder 2: Lumiflon® FE 4300 from AGC Chemicals, water-based FEVE emulsion having 50 weight % solids content and a hydroxyl value of about 10 mg KOH/g.
3. Polymeric Binder 3: Impranil® DL 2611 from Covestro AG, water based anionic aliphatic polyester-polyurethane dispersion
4. Film Forming Lubricant 1: Y 19231 from Momentive Products, water based cyclo silicone lubricant having a 45 weight % solids content.
5. Film Forming Lubricant 2: AG-E300D X-1490HCS from AGC Chemicals, polymeric resin with perfluoroalkyl chains having a 35 weight % solids content.
6. Cross-linking agent: Bayhydur® 302 from Bayer chemicals, hexamethylene diisocyanate.

7. Non-Film Forming Lubricant—HV 495 from Dow Corning®, polydimethylsiloxane emulsion having a 35 weight % solids content.
8. Defoamer—BYK 028 defoamer from BYK Additives and Instruments.
9. Coalscent agent—BYK 348 coalscent agent from BYK Additives and Instruments.
10. Filler—Boron Nitride Powder.

TABLE 1

| Component | Example 1 | Example 2 | Example 3 | Example 4 | Example 5 |
|---|---|---|---|---|---|
| Polymeric Binder 1 | — | 35 | 35 | 35 | — |
| Polymeric Binder 2 | — | — | — | — | — |
| Polymeric Binder 3 | — | — | — | — | 100 |
| Film Forming Lubricant 1 | — | — | — | — | — |
| Film Forming Lubricant 2 | — | — | — | — | — |
| Cross-Linking Agent | — | — | — | 7.5 | — |
| Non-Film Forming Lubricant | — | — | — | — | — |
| Defoamer | — | — | 0.5 | 0.5 | — |
| Coalscent Agent | — | — | 0.5 | 0.5 | — |
| Filler | — | — | — | — | — |
| Total | — | — | 36 | 43.5 | 100 |
| Properties | | | | | |
| Unaged Ice Adherence (kPa) | 450 | — | 100.0 | 83.4 | 90 |
| Ice Adherence after heat aging at 150° C. for 14 days | 428 | — | 111 | 117 | 123 |
| Ice Adherence after heat aging at 150° C. for 30 days | 456 | — | 130 | 109 | 228 |
| Ambient cure touch to dry (hours) | — | >8 | >8 | >8 | <8 |
| Heat cure time (minutes) | — | >2 | <2 | <2 | <2 |

As depicted by Table 1, each of Examples 1 to 5 is comparative because the compositions do not include a film forming lubricant. Additionally, each of Examples 1 to 5 failed to demonstrate favorable ice adhesion values. Example 1 is an uncoated aluminum substrate prepared by sandblasting. Example 2 failed to produce a uniform film and cracks were observed.

TABLE 2

| Component | 6 | 7 | 8 | 9 | 10 | 11 | 12 | 13 | 14 | 15 | 16 |
|---|---|---|---|---|---|---|---|---|---|---|---|
| Polymeric Binder 1 | 35 | 35 | 35 | 35 | 35 | 35 | 35 | 35 | 35 | 35 | — |
| Polymeric Binder 2 | — | — | — | — | — | — | — | — | — | — | 35 |
| Film Forming Lubricant 1 | 10 | 20 | 30 | — | — | — | 10 | — | 10 | 10 | 10 |
| Film Forming Lubricant 2 | — | — | — | 10 | 20 | 30 | 10 | 20 | 10 | 10 | 10 |
| Cross-Linking Agent | 7.5 | 7.5 | 7.5 | 7.5 | 7.5 | 7.5 | 7.5 | 7.5 | 7.5 | 7.5 | — |
| Non-Film Forming Lubricant | — | — | — | — | — | — | — | 5 | 5 | 5 | 5 |
| Defoamer | 0.5 | 0.5 | 0.5 | 0.5 | 0.5 | 0.5 | 0.5 | 0.5 | 0.5 | 0.5 | 0.5 |
| Coalscent Agent | 0.5 | 0.5 | 0.5 | 0.5 | 0.5 | 0.5 | 0.5 | 0.5 | 0.5 | 0.5 | 0.5 |
| Filler | — | — | — | — | — | — | — | — | — | 10 | — |
| Total | 53.5 | 63.5 | 73.5 | 53.5 | 63.5 | 73.5 | 63.5 | 68.5 | 68.5 | 78.5 | 61 |
| Properties | | | | | | | | | | | |
| Ice Adherence (kPa) | 37.2 | 29.0 | 29.0 | 30.3 | 29.0 | 29.0 | 25.2 | 26.2 | 24.1 | 32.4 | 26.9 |
| Ambient cure touch to dry (hours) | <8 | <8 | <8 | <8 | <8 | <8 | <8 | <8 | <8 | <8 | <8 |
| Heat cure time (minutes) | <2 | <2 | <2 | <2 | <2 | <2 | <2 | <2 | <2 | <2 | <2 |

Table 2 depicts Inventive Examples 6 to 16. In contrast to Table 1, each Inventive Example includes a polymeric binder and a film forming lubricant and each Inventive Example demonstrates excellent properties. For example, each Inventive Example has an ice adhesion strength of about 40 kPa or less. Each of Inventive Examples 6 to 16 also exhibits a water contact angle of about 80° to about 140°.

Inventive Examples 14 and 15 illustrate the undesired effect of filler on compositions. The addition of filler to Example 15 increases the strength required to remove ice as compared to an identical composition (Example 14) without filler.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A coating composition comprising:
    a polymeric binder consisting of a first polymer, wherein the first polymer is a fluoroethylene-alkyl vinyl ether ("FEVE") copolymer, and wherein the polymeric binder is dispersed in water;
    a film forming lubricant comprising a second polymer, the second polymer comprising a fluoropolymer or silicone polymer, wherein the first polymer and second polymer are different; and
    a non-film forming lubricant; and
    wherein the coating composition is substantially free of organic solvents.

2. The coating composition of claim 1, wherein the FEVE copolymer of the polymeric binder comprises about 20% to about 80%, by dry weight, of the coating composition and the film forming lubricant comprises about 10% to about 30%, by dry weight, of the coating composition.

3. The coating composition of claim 2, further comprising from about 5% to about 45%, by dry weight, of a crosslinking agent.

4. The coating composition of claim 3, wherein the crosslinking agent comprises one or more of isocyanate, methoxy silane, epoxy silane, and a reactive silicone.

5. The coating composition of claim 1, wherein the non-film forming lubricant comprises one or more of dimethicone, a silicon emulsion, and polydimethylsiloxane oil.

6. The coating composition of claim 1, further comprising one or more of a coalescent agent, a defoamer, an adhesion promoter, a viscosity modifier, a wetting agent, a film leveling agent, and a dispersion agent.

7. The coating composition of claim 1, further comprising one or more of a heat stabilizer, a light stabilizer, a UV stabilizer, a filler, a pigment, and a colorant.

8. The coating composition of claim 1 is substantially free of a filler.

9. The coating composition of claim 1, further comprising:
    about 5% to about 45% of a crosslinking agent comprising one or more of isocyanate, methoxy silane, epoxy silane, and a reactive silicone; and
    one or more of a coalescent agent, a defoamer, a film leveling agent, and a UV stabilizer.

10. A coating formed from the coating composition of claim 1.

11. The coating of claim 10 exhibits a water contact angle of about 80° to about 140°.

12. The coating of claim 10, wherein ice adheres with about 50 kPa or less of force.

13. The coating of claim 10, wherein ice adheres with about 100 kPa or less of force after heat aging at about 150° C. for 30 days.

14. The coating of claim 10 passes a 1 inch Mandrel Bend Test.

15. The coating of claim 10 passes a 2 inch Mandrel Bend Test after heat aging at 150° C. for 30 days.

16. An overhead conductor comprising the coating of claim 10.

17. The overhead conductor of claim 16, further comprising one or more conductive wires.

18. The overhead conductor of claim 16, wherein ice adheres with about 50 kPa or less of force.

* * * * *